United States Patent Office 2,936,238
Patented May 10, 1960

2,936,238

MANUFACTURE OF HARD BUTTER

Theodore J. Weiss, Park Forest, Ill., assignor to Swift & Company, Chicago, Ill., a corporation of Illinois No Drawing. Application August 9, 1956
Serial No. 603,182

7 Claims. (Cl. 99—118)

This invention provides an improved process for the manufacture of hard butter and more particularly is concerned with a process for preparing hard butter from a mixture of triglycerides.

Hard butter is a triglyceride which has been used for many years by the confectionery industry as a fat in coating materials. Standard coatings normally contain hard butter, cocoa, sugar and a small amount of an emulsifier, usually lecithin. Fats used in a coating composition must meet certain strict standards. For instance, a hard butter must be free of a waxy taste in the mouth. It must have a melting point between about 90° F. and 120° F., measured in accordance with the capillary method which is the standard method approved and recognized by the American Oil Chemists Society. Another method widely used to measure melting points is the Wiley method. A hard butter should be brittle at room temperature and should have a rather sharp melting point, that is to say the hard fat, up to the melting point, should have a high solid content and be characterized by a shortness of melt. A coating composition containing an acceptable hard butter should not show any appreciable change in appearance with exposure to normal food handling temperatures. An acceptable hard butter should be free from objectionable odors, have a bland taste, and the free fatty acid content must be relatively low.

Historically, hard butters were prepared from processing natural occurring oils containing large amounts of lauric acid radicals such as cocoanut oil and the palm kernel oils. This process is known as "graining," and the products produced usually had a melting point within the range of 90–100° F., which is too soft for some purposes. The market of these oils has been erratic over the years and hence in recent years increasingly larger quantities of hard fat have been manufactured from a mixture of triglycerides which contain non-lauric acid fats in addition to lauric acid containing fats. The selected mixture of triglycerides is converted to hard butter by holding the mixture in a liquid phase preferably at a low temperature below approximately 150° C. in the presence of an alkaline or alkali metal interesterification catalyst such as sodium methoxide or sodium ethoxide, alkali metals, their oxides and hydrides. Other well known interesterification catalysts such as tin and tin compounds may be used at the higher temperatures. Upon completion of the rearrangement reaction, the catalyst is destroyed with water or acid, and the inactivated catalyst removed. The treated triglyceride is then bleached and deodorized in the usual manner of all fats and oils. In the conventional method of manufacturing hard butter from a mixture of selected triglycerides, the mixture is hydrogenated and this hydrogenation may be either before the above rearrangement treatment or afterwards. The hydrogenation may be complete or substantially complete or may be carried on to a lesser extent. It has been generally recognized that the order in which the mixture is treated by hydrogenation and by catalytic rearrangement makes little or no difference in the properties of the resulting hard butter.

In the manufacture of hard butter for sale to the confectionery industry, it is highly desirable to be able to prophesy with accuracy the melting point of the end product, since the confectionery industry expects the hard fat furnished to them to be within one degree Fahrenheit or so of the specified melting point. Hence, it is very important to be able to control a hard butter process within such narrow limits. The hard butter made in accordance with the "graining" process used for many years in manufacturing the product from cocoanut oil is reasonably reliable and can be generally expected to provide a butter of the desired melting point. Unfortunately, the more recently developed process described above for manufacturing hard butter from a mixture of selected triglycerides is unreliable in producing a product having a melting point within the acceptable range of error of approximately one degree Fahrenheit.

It is an object of the invention to provide a method which permits the manufacture of a hard butter from a mixture of triglycerides which process can be relied upon to produce a hard butter with little variation in melting point from the calculated value. Another object of this invention is to provide a method for manufacturing hard butter from a mixture of triglycerides containing less of the lauric acid containing triglycerides.

These and other objects will be apparent from the following description of the invention.

Lauric acid containing glycerides (also referred to as lauric acid oils) such as cocoanut oil or a palm kernel oil are historically higher in price than non-lauric acid containing fats which are usually of a domestic origin. Hence, it is desirable that an acceptable hard fat be manufactured from a mixture of triglycerides containing lesser amounts of the imported lauric acid containing fat.

In its broad aspects, the process of my invention comprises providing a mixture of a previously hydrogenated nonlauric acid containing triglyceride and a triglyceride containing a substantial amount of the lauric acid radical and treating such mixture of triglycerides in a liquid state preferably at a temperature below about 150° C. with a small amount of a low temperature rearrangement catalyst until the rearrangement reaction is substantially completed and thereafter inactivating the catalyst and separating the rearranged triglyceride therefrom. The product from this process is fit for use as a hard butter and need not be subjected to a later hydrogenation operation as is now commonly practiced. It is my belief that the utilization of the soft lauric acid type triglycerides such as unhydrogenated cocoanut oil in the rearrangement process makes possible the forecasting with reasonable certainty the melting point of the end product. Apparently, the avoidance of hydrogenation in the presence of lauric acid fats renders my process more reliable than the conventional method. The hydrogenated non-lauric acid triglyceride may be any of many available materials, such as cottonseed oil, peanut oil, palm oil, tallow and lard. The hydrogenated fat should have an iodine value less than 15 and a titer in excess of approximately 53. The ratio of cocoanut oil to hydrogenated fat is determined by the melting point desired in the hard butter.

The following algebraic equation gives with reasonable accuracy the necessary proportions of lauric acid containing fats and hydrogenated fat (hard fat) in a mixture to give a hard butter with a desired melting point:

$$X = A + (B \cdot Y)$$

where
X is the desired melting point of the resulting hard butter in degrees Fahrenheit measured on the basis of the capillary method, A is the melting point in degrees Fahrenheit measured on the basis of the capillary method of the lauric acid containing fat on interesterification in the absence of the hydrogenated fat of the mixture, B is a factor peculiar to the particular lauric acid fat employed in the mixture and is an expression of the change in melting point (° F.) per each unit change (percent) in the amount of the hydrogenated fat in the total mixture, and Y is the percentage of the hydrogenated non-lauric acid fat in the total mixture.

When cocoanut oil is used in the mixture the value for A is generally 82, and the B value is 0.64. The melting point (A) for interesterified palm kernel oil will vary somewhat from batch to batch depending upon the origin of the oil, species of palm, and other factors. A representative palm kernel oil may have an interesterified melting point in the vicinity of 86° F. The factor B for this oil would be approximately 0.66.

Most confectioners' coating fats for which these hard butters are designed will melt from 95° to 120° F., depending upon the requirements of the user. A range of blends of 20 to 60% hydrogenated fats with the balance soft cocoanut oil or palm kernel oil will generally meet the needs of the commercial users.

As mentioned before, it has been my experience in preparing hard butters by the conventional rearrangement and hydrogenation method of a mixture of triglycerides, that the melting point will vary erratically from the predicted value. The following table illustrates the problem that is commonly experienced in utilizing the conventional process. Each of the samples reported comprised a blend of soft cottonseed and soft cocoanut oil, with the cottonseed oil being present in the amount of 35% and the cocoanut oil in the amount of 65% of the total mixture. Each of the five batches described below was rearranged at a temperature of 185° F. with the use of a sodium methoxide catalyst. The process was carried on until rearrangement was completed. Thereafter, the catalyst was killed by adding water to the mixture, the treated triglyceride was recovered and then hydrogenated.

TABLE I

| Refractive Index [1] | | | Iodine Value | Cloud Point, °C. | Melting Point, °F. | |
|---|---|---|---|---|---|---|
| Original | Final | Drop | | | Predicted | Obtained |
| 33.0 | 26.8 | 6.2 | 8.5 | 29.8 | 103 | 107 |
| 33.5 | 28.5 | 5.0 | 15.6 | 27.2 | 105 | 107 |
| 33.0 | 27.9 | 5.1 | 13.9 | 27.3 | 103 | 105 |
| 33.05 | 27.3 | 5.75 | 16.7 | 29.2 | 107 | 110 |
| 31.8 | 27.45 | 4.35 | 13.2 | 27.0 | 106 | 103 |

[1] Butyro Scale (see Technical Methods of Analysis, R. C. Griffin, 2nd ed., McGraw-Hill, 1927).

The refractive index drop was employed as the control of the batches reported in Table I. This is a standard method for control and is used as it normally correlates well with iodine values for fats generally. The cloud point test is also normally a good control method for hydrogenation. It will be seen that here where a lauric acid containing fat is involved neither the refractive index drop nor cloud point prove to be a good control and that the predicted melting points varied considerably and erratically from the melting points actually obtained. The foregoing strongly demonstrates the need for my improved process.

The following examples are illustrative of the invention:

*Example I*

65 parts of refined cocoanut oil was blended with 35 parts hydrogenated cottonseed oil in a vessel and heated to 194° F. for 30 minutes using 0.5% sodium methoxide on total fat basis as a catalyst for the reaction. The cocoanut oil had a saponification number of 253 and iodine value of 9.2. The hydrogenated cottonseed oil had a 59.2 titer and an iodine value of 12.8. The fats were continuously agitated throughout the heating period. The reaction was judged to be completed when the treated fats had taken on a reddish-brown color. The catalyst was then inactivated with water and the resultant foots were filtered off. The hard butter resulting from the reaction was then bleached and deodorized in the conventional manner.

The hard butter of this example had a capillary melting point of 105° F. and a Wiley melting point of 104° F. The predicted capillary melting point in accordance with the equation discussed earlier was 104.4° F. The finished product had the proper brittleness and sharp melting characteristics which typify a good hard butter. A confectioners' coating made from the product was normal in every respect.

*Example II*

The mixture of this example contained 50 parts each of the cocoanut oil and hydrogenated cottonseed oil. Portions from the same batches of cocoanut oil and cottonseed oil described in the previous example were used. The product was treated in a manner identical to that of Example I. The resulting product after rearrangement analyzed: Capillary melting point, 114° F., Wiley melting point, 113° F. The obtained capillary melting point was the predicted value. The product, when used in a typical confectioners' chocolate coating, proved to be an acceptable hard butter.

*Example III*

The refined cocoanut oil employed in the instant sample had a saponification number of 256 and an 8.4 iodine value, and the hydrogenated cottonseed oil had a 61.5 titer and a 1.6 iodine value. 65 parts of the cocoanut oil was mixed with 35 parts of the hydrogenated cottonseed oil and the product processed in a manner identical to that of Example I. Here the rearranged product proved to have a capillary melting point of 105° F. and a Wiley melting point of 104° F. It will be noted these values are the same as for the hard butter of Example I. Apparently the difference in characteristics of the starting fats of the two examples was not sufficient to cause a difference in the melting points of the end products. The hard butter proved to have the necessary characteristics of a sharp melting point and proper brittleness for use in confectioners' coatings.

*Example IV*

The same fats as were utilized in Example III were employed to prepare the blend of this example. The two fats were used in amounts of 50 parts each and the blended fats were subjected to the same conditions of processing as described in Example I. The resulting hard fat exhibited a capillary melting point of 114° F. and a Wiley melting point of 113° F. It will be noted that this example closely approximates Example II, differing in that the cocoanut oil and cottonseed oil were from different batches. The product was found to be useful as a hard butter.

*Example V*

The fats of Example III were blended in the amounts of 70 parts cocoanut oil and 30 parts hydrogenated cottonseed oil. The blend was processed in accordance with the conditions of Example I, and on completion of the rearrangement the product was analyzed and found to have a capillary melting point of 101° F. and a Wiley melting point of one degree lower. The actual melting point closely approximates the theoretical value of 101.2° F.

Example VI

The non-lauric acid containing fat of this examples was fully hydrogenated palm oil having a 56.6 titer and a 0.9 iodine value. The refined cocoanut oil of the blend was from the same lot as that employed in Example III. The cocoanut oil made up 65% of the blend, with the hydrogenated palm oil constituting the balance. The mixture was treated in a fashion identical to the process described in Example I. The final product analyzed: Capillary melting point, 105° F., Wiley melting point 104° F. The product was judged to be a useful hard butter. It will be noted that the actual obtained capillary melting point closely approximates the theoretical value of 104.4° F.

Example VII

The fats of the instant blend were the same as described in preceding Example VI, and were mixed together in 50/50 proportions. The mixture was processed in accordance with the method of Example I and the rearranged fat analyzed to have a capillary melting point of 114° F. and a Wiley melting point of 113° F. The product was utilized as a fat for a typical confectioner's coating and proved to be acceptable.

Example VIII

Hydrogenated tallow having a 58.7 titer and a 4.4 iodine value was used as the non-lauric acid containing fat of the instant blend, with refined cocoanut oil being utilized as the lauric acid containing fat. The cocoanut oil had a saponification number of 256 and an iodine value of 8.4. The cocoanut oil is from the same batch as that used in the blend of Example III. The mixture contained 65 parts cocoanut oil to 35 parts of the hydrogenated tallow. The blend was processed with the conditions of Example I and upon completion of the rearrangement process and subsequent water washing and deodorization was found to have a capillary melting point of 105° F. and 104° F., Wiley. It will be noted that the substitution of the hydrogenated tallow for the hydrogenated cottonseed oil of the blend of Examples I and III had no appreciable effect on the melting points of the hard butter obtained. This strikingly demonstrated the adaptability of the applicant's process to the various related fats without jeopardizing the characteristics of the end product. The hard butter of this example was used as the fat in a representative confectioner's coating formulation and in this capacity was found to be wholly satisfactory in that it imparted no "waxy" taste or feeling in the mouth, exhibited a sharp melting point, and had the proper brittleness.

Example IX

The fats of preceding Example VIII were blended in 50/50 portions and processed in the manner described previously. The capillary melting point of the rearranged fat was 114° F. The actual melting point is the one predicted, and is the same melting point as Examples II and IV. Again, this illustrates the possibility of using various equivalent fats in the process of the invention.

Example X

The non-lauric acid containing fat of the instant blend was hydrogenated peanut oil with a 60.9 titer and 7.7 iodine value. A refined cocoanut oil was used as the other fat of the blend and the two were mixed together in the ratio of 65 parts cocoanut oil to 35 parts peanut oil. The cocoanut oil was from the same batch as that of Example III. The blend was processed in accordance with the process of Example I. The rearranged product analyzed to have a capillary melting point of 105° F. It will be seen that the substitution of hydrogenated peanut oil for the cottonseed oil hard fat of Example III did not significantly alter the melting point characteristics of the resulting hard butter.

Example XI 3100 lbs. refined cocoanut oil with the saponification number of 251 and a 9.1 iodine value was blended with 1900 lbs. hydrogenated cottonseed oil which had a 61.8 titer and 1.7 iodine value. The blend was placed in a vessel and continuously agitated for one hour at 185° F. in the presence of 30 lbs. of sodium methoxide catalyst. The product was then water washed to inactivate the catalyst and subsequently bleached and deodorized in a conventional manner. After deodorization, the product was analyzed and found to have a capillary melting point of 107° F. and a Wiley melting point of 106° F. The predicted capillary melting point was 106.3° F., which closely approximated the obtained value.

Example XII 70 parts of refined palm kernel oil was blended with 30 parts of hydrogenated cottonseed oil in a vessel and heated to 195° Fahrenheit for 35 minutes using 0.6% sodium methoxide on a total fat basis for the catalyst for the reaction. The palm kernel oil had an iodine value of 16.4 and a saponification number 248. The hydrogenated cottonseed oil had a 61.5 titer and a 1.6 iodine value. The reaction was discontinued when the mixture had taken on a reddish-brown color. The catalyst was inactivated with water, the foots separated and the resulting hard butter was bleached and deodorized in the conventional manner.

The hard butter had a capillary melting point of 106° F. measured by the capillary melting test and a Wiley melting point of 105° F. The capillary melting point compared favorably to the calculated value of 105.8° F. The product exhibited sharp melting characteristics and characteristic brittleness expected in a fat to be used in a confectioners' coating.

Sodium methoxide is the preferred catalyst for this reaction because of the ease with which it may be used and the low temperatures at which it is effective. Equivalent catalysts such as stannous chloride and other tin salts may be employed, but the tin salts are not recommended because of the high temperatures at which the reaction must be carried on for the catalyst to be effective. Other equivalent rearrangement catalysts known to the prior art, including various alkali metals and alkali earth metal, their alkoxides and hydrides, may be substituted for the preferred sodium methoxide. The actual conditions of the rearrangement process are well known to the art. The essence of my invention lies in the appreciation and selection of certain fats to constitute a blend which on rearranging will give a product having the characteristics commonly associated with a hard butter, and in addition, the practice of my process permits the predicting with reasonable accuracy the melting point of the resulting hard butter. Depending on the requirements of the commercial user, the amount of hydrogenated non-lauric acid containing fats used in the blend will vary from 20 to 60%, with the rest of the blend made up of a soft cocoanut oil, or a palm kernel oil, or a combination thereof.

For the purpose of this process, the lauric acid containing fats are considered to be those fats which have a high content of lauric acid as typified by cocoanut oil and the various palm kernel oils. Cocoanut oil and palm kernel oils have an exceedingly high lauric acid content which will normally lie within the range of 40 to 50 percent of the total acid present.

I am aware that some of the oils which may be used as a hydrogenated constituent of the mixture, such as lard and tallow, contain very minor amounts of lauric acid, for lard it is less than 0.1% and for tallow less than 0.2%. However, such minute amounts of lauric acid do not prevent the use of these oils as the hydrogenated fat of the mixture.

The hydrogenated non-lauric acid containing triglycerides that may be used in my process are many and particularly useful are the oleic and linoleic acid oils such as cottonseed oil, peanut oil, soybean oil, palm oil, tallow, lard, sesame oil, safflower oil and sunflower seed oil. Various marine oils, e.g., menhaden oil, herring oil, and pilchard oil, could be used but they are not generally as readily available. The non-lauric acid oils used in the process are essentially fully hardened and will have, generally speaking, an iodine value less than 15 and a titer in excess of about 53.

With the use of my process, the melting point in the final product becomes merely a function of the formulation. This is a distinct advantage as it permits the manufacture of a hard butter to produce a consistently commercially acceptable product.

Confectioners insist that the fats sold to them for use as a hard butter meet strict specifications, and a variation greater than a degree or two of the specified melting point will frequently cause rejection of the product.

Obviously many modifications and variations of the invention as hereinbefore set forth may be made without departing from the spirit and scope thereof, and therefore only such limitations should be imposed as are indicated in the appended claims.

I claim:

1. A method of manufacturing hard butter having a desired melting point comprising: providing a mixture of hydrogenated non-lauric acid containing triglyceride with an iodine value less than 15 and a titer in excess of 53 and an unhydrogenated lauric acid oil, said hydrogenated triglyceride being present in an amount defined on a percentage basis of the total mixture in accordance with the following formula:

$$Y = \frac{X - A}{B}$$

where Y is the percentage of the hydrogenated non-lauric acid containing triglyceride in the total mixture, where X ranges between 90 and 120 and is the desired melting point in degrees Fahrenheit based on the capillary method for melting point determination, where A is the melting point in degrees Fahrenheit of the lauric acid oil on interesterification in the absence of the hydrogenated fat of the mixture measured by the capillary method, and where B is the factor peculiar to the particular lauric acid oil employed in the mixture and is an expression of the change in melting point (degrees Fahrenheit) per each unit change (percent) in the amount of the hydrogenated fat in the total mixture; treating such mixture of triglycerides while maintained in the liquid state with an effective amount of rearrangement catalyst until the reaction is substantially complete; and then inactivating the catalyst; and separating the rearranged triglycerides.

2. A process in accordance with claim 1 wherein the lauric acid oil is selected from the group consisting of cocoanut oil and a palm kernel oil and combinations thereof.

3. A process in accordance with claim 1 wherein the hydrogenated non-lauric acid triglyceride is selected from the group consisting of cottonseed oil, peanut oil, soybean oil, palm oil, tallow, lard, sesame oil, safflower oil, sunflower seed oil and combinations thereof.

4. A method of manufacturing hard butter having a desired melting point comprising: providing a mixture of a hydrogenated non-lauric acid containing triglyceride with an iodine value less than 15 and a titer in excess of 53 and unhydrogenated palm kernel oil, said hydrogenated triglyceride being present in an amount defined on a percentage basis of the total mixture in accordane with the following formula:

$$Y = \frac{X - 86}{0.66}$$

where Y is the percentage of the hydrogenated triglyceride in the total mixture, and where X ranges between 90 and 120 and is the desired melting point in degrees Fahrenheit based on the capillary method for melting point determination; treating such mixture of triglycerides while maintained in the liquid state with an effective amount of rearrangement catalyst until the reaction is substantially complete; and then inactivating the catalyst; and separating the rearranged triglycerides.

5. A process in accordance with claim 4, wherein the hydrogenated non-lauric acid triglyceride is a hard fat selected from the group consisting of cottonseed oil, peanut oil, soybean oil, palm oil, tallow, lard, sesame oil, safflower oil, sunflower seed oil and combinations thereof.

6. A method of manufacturing hard butter having a desired melting point comprising: providing a mixture of a hydrogenated non-lauric acid containing triglyceride with an iodine value less than 15 and a titer in excess of 53 and unhydrogenated cocoanut oil, said hydrogenated triglyceride being present in an amount defined on a percentage basis of the total mixture in accordance with the following formula:

$$Y = \frac{X - 82}{0.64}$$

where Y is the percentage of the hydrogenated fat in the total mixture, and where X ranges between 90 and 120 and is the desired melting point in degrees Fahrenheit calculated on the basis of the capillary method for melting point determination; treating such mixture of triglycerides while maintained in the liquid state with an effective amount of rearrangement catalyst until the reaction is substantially complete; and then inactivating the catalyst and separating the rearranged triglycerides.

7. A process in accordance with claim 6, wherein the hydrogenated non-lauric acid triglyceride is a hard fat selected from the group consisting of cottonseed oil, peanut oil, soybean oil, palm oil, tallow, lard, sesame oil, safflower oil, sunflower seed oil and combinations thereof.

References Cited in the file of this patent

UNITED STATES PATENTS

| | | |
|---|---|---|
| 2,378,005 | Eckey | June 12, 1945 |
| 2,442,532 | Eckey | June 1, 1948 |
| 2,442,536 | Eckey | June 1, 1948 |
| 2,726,158 | Cochran et al. | Dec. 6, 1955 |

OTHER REFERENCES

Bailey: Cottonseed and Cottonseed Products, Interscience Publishers Inc., New York, page 397 (1948).

Landmann et al.: The Journal of The American Oil Chemists Society, July 1956 issue, vol. XXXIII, No. 7, pp. 308–311.